(12) United States Patent
Tatsumoto et al.

(10) Patent No.: US 11,643,046 B2
(45) Date of Patent: May 9, 2023

(54) CONTROL APPARATUS, SEAT BELT APPARATUS, VEHICLE, METHOD OF OPERATING SYSTEM, AND MEDIUM

(71) Applicant: Toyota Jidosha Kabushiki Kaisha, Toyota (JP)

(72) Inventors: Yuki Tatsumoto, Nagoya (JP); Toshiki Kashiwakura, Tokyo-to (JP); Manabu Ishihara, Nagoya (JP); Akira Sasaki, Miyoshi (JP); Sachin Ahire, Frisco, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 17/399,502

(22) Filed: Aug. 11, 2021

(65) Prior Publication Data

US 2022/0048464 A1    Feb. 17, 2022

(30) Foreign Application Priority Data

Aug. 11, 2020  (JP) .............................. JP2020-136001

(51) Int. Cl.
| | |
|---|---|
| *B60R 22/415* | (2006.01) |
| *B60R 21/015* | (2006.01) |
| *B60W 60/00* | (2020.01) |
| *B60R 22/46* | (2006.01) |
| *B60R 22/48* | (2006.01) |
| *B60R 22/00* | (2006.01) |

(52) U.S. Cl.
CPC ........ *B60R 22/415* (2013.01); *B60R 21/0155* (2014.10); *B60W 60/0016* (2020.02); *B60R 2022/003* (2013.01); *B60R 2022/4666* (2013.01); *B60R 2022/4816* (2013.01); *B60R 2022/4841* (2013.01); *B60W 2540/21* (2020.02); *B60W 2540/22* (2013.01)

(58) Field of Classification Search
CPC ......... B60W 60/0016; B60W 2540/21; B60W 2540/22; B60R 2022/003
See application file for complete search history.

(56) References Cited

U.S. PATENT DOCUMENTS

| | | | |
|---|---|---|---|
| 2018/0312127 A1 | 11/2018 | Lalague | |
| 2018/0339675 A1* | 11/2018 | Jenny | .................. B60R 21/0132 |
| 2019/0299877 A1* | 10/2019 | Saito | .................... B60R 11/0235 |
| 2021/0397858 A1* | 12/2021 | Buerkle | .......... B60W 60/00253 |

FOREIGN PATENT DOCUMENTS

| | | | | |
|---|---|---|---|---|
| CN | 111137244 A | * | 5/2020 | |
| FR | 3065681 A1 | | 11/2018 | |
| JP | 2016107817 A | | 6/2016 | |
| JP | 2020111291 A | * | 7/2020 | |
| WO | WO-2019111244 A1 | * | 6/2019 | ......... B60H 1/00357 |

* cited by examiner

*Primary Examiner* — Jelani A Smith
*Assistant Examiner* — Nada Mahyoob Alqaderi
(74) *Attorney, Agent, or Firm* — Dinsmore & Shohl LLP

(57) ABSTRACT

A control apparatus includes a controller configured to, upon determining, based on behavior classification, that a behavior of a passenger detected from a captured image or a sound of inside of a vehicle is threatening, transmit a first instruction to increase tension of a seat belt worn by the passenger.

17 Claims, 4 Drawing Sheets

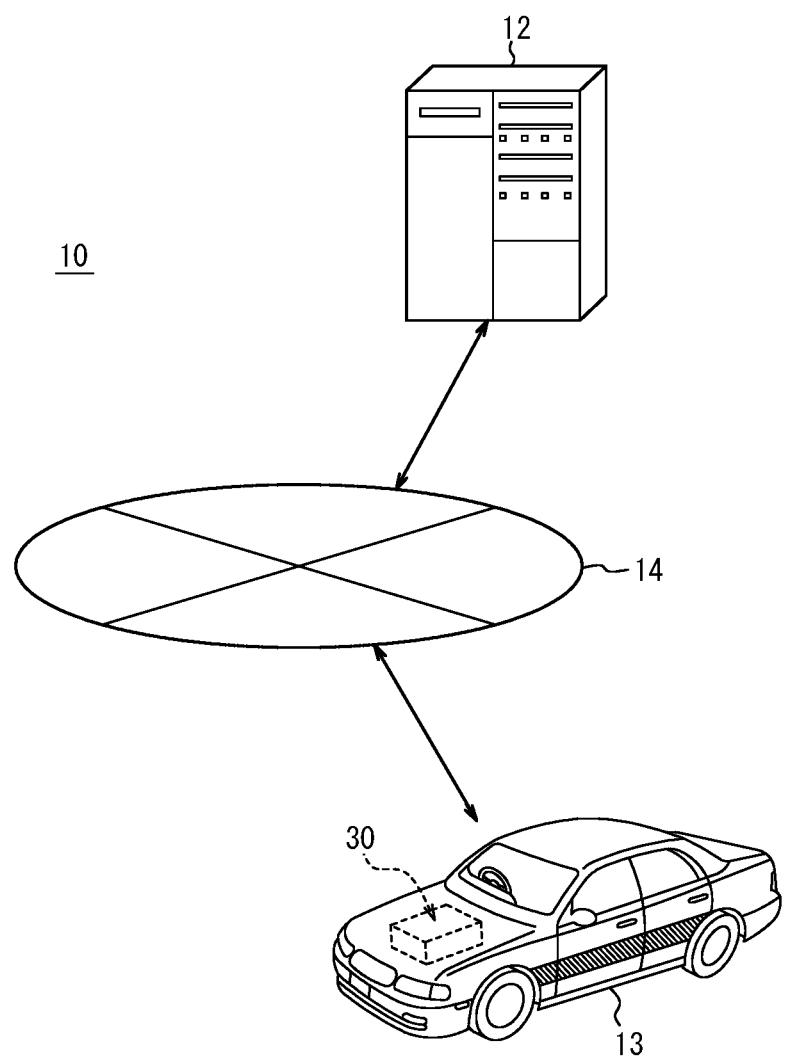

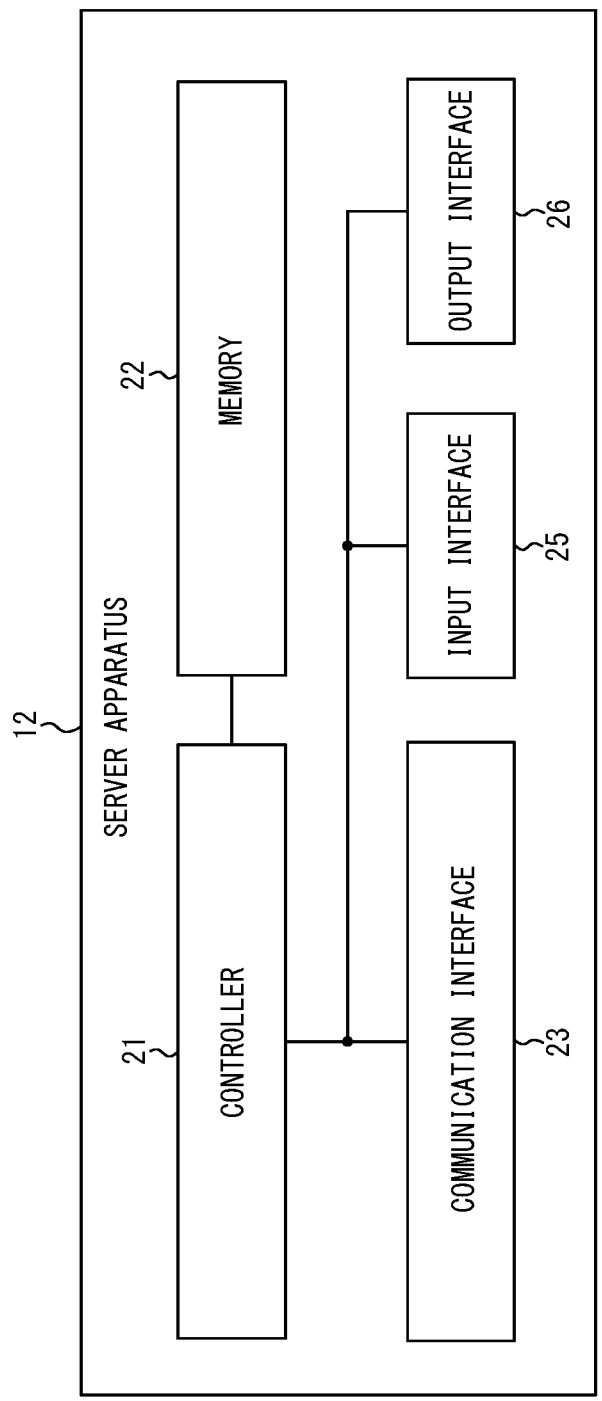

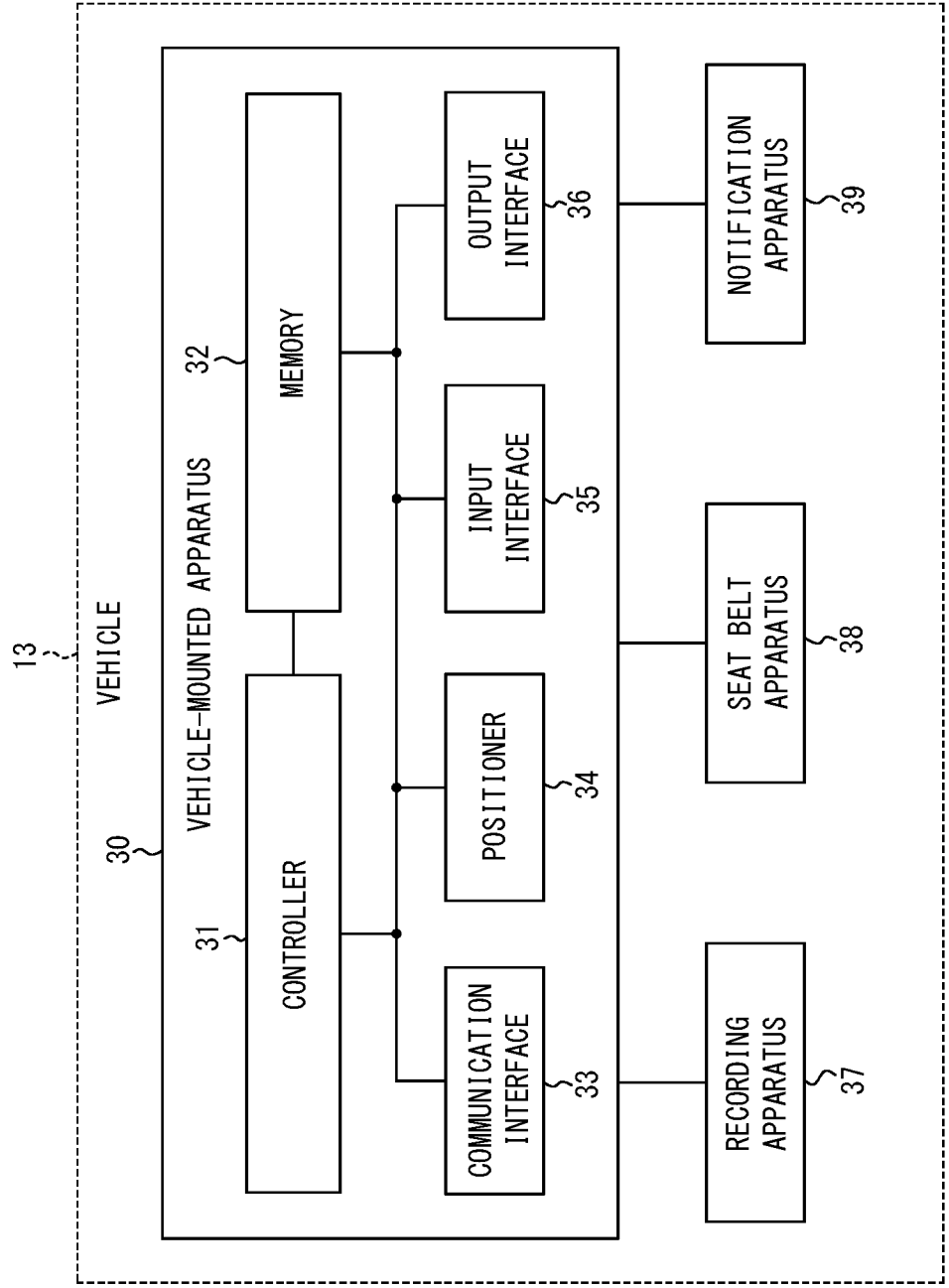

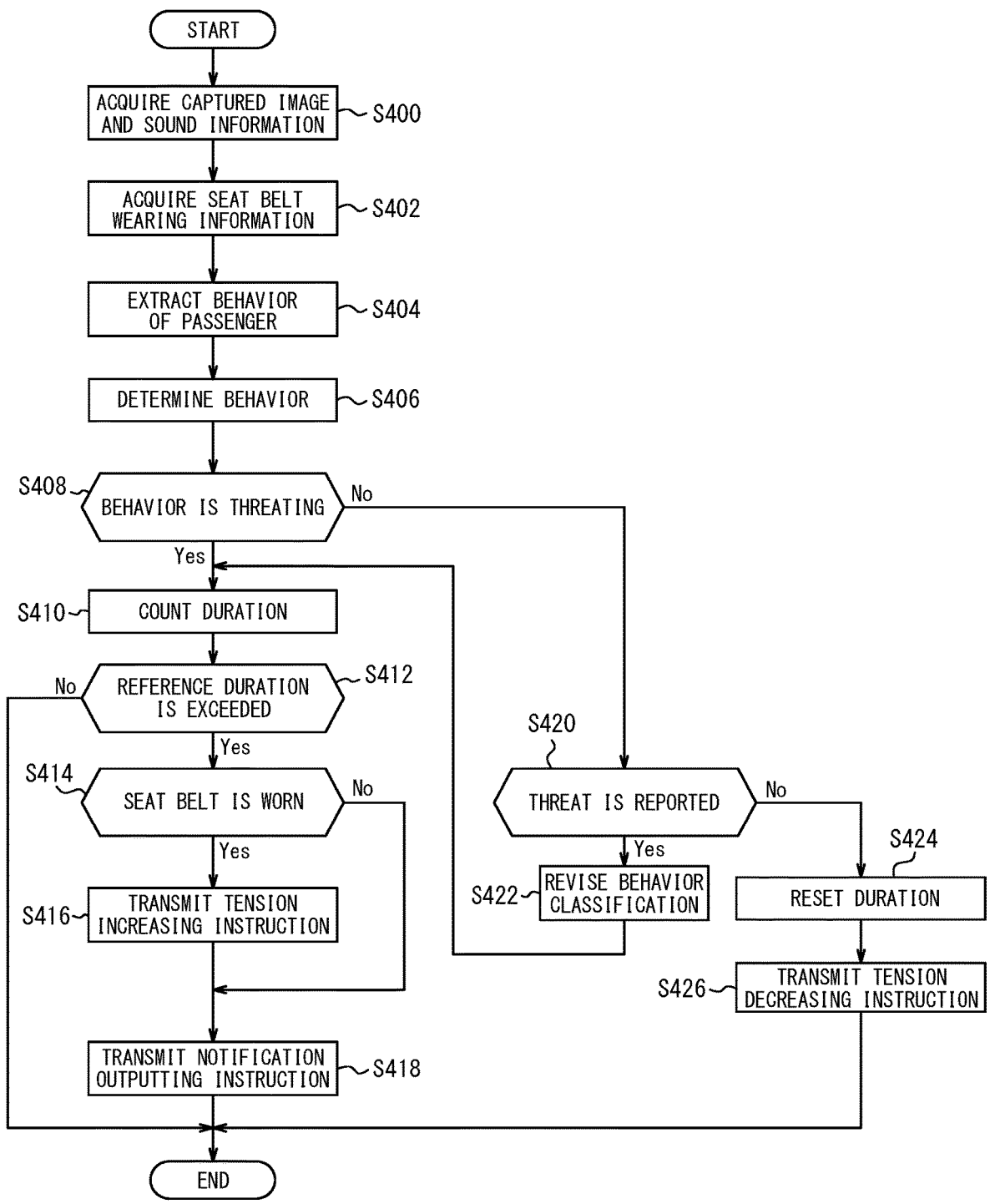

CONTROL APPARATUS, SEAT BELT APPARATUS, VEHICLE, METHOD OF OPERATING SYSTEM, AND MEDIUM

CROSS-REFERENCE TO RELATED APPLICATION

This application claims priority to Japanese Patent Application No. 2020-136001, filed on Aug. 11, 2020, the entire contents of which are incorporated herein by reference.

TECHNICAL FIELD

The present disclosure relates to a control apparatus, a seat belt apparatus, a vehicle, a method of operating a system, a medium, and a storage medium.

BACKGROUND

To detect various hazards occurring in vehicle, technology for monitoring the state of a passenger with a camera is known, such as patent literature (PTL) 1. Hazards that occur in a vehicle include cases in which the driver is assaulted by a passenger in a taxi or during ridesharing. As technology for protecting a driver from such threats posed by a passenger, technology is known for providing an extendable partition between the driver's seat and other seats and operating the partition to separate the driver from the passenger (PTL 2).

CITATION LIST

Patent Literature

PTL 1: JP 2016-107817 A
PTL 2: FR 3065681 A

SUMMARY

Demand exists for technology to protect a driver or a fellow passenger simply and reliably against a threat posed by a passenger.

A control apparatus according to the present disclosure includes a controller configured to, upon determining, based on behavior classification, that a behavior of a passenger detected from a captured image or a sound of inside of a vehicle is threatening, transmit a first instruction to increase tension of a seat belt worn by the passenger.

A method of operating according to the present disclosure is a method of operating a control apparatus for controlling a seat belt apparatus. The method includes:

transmitting, by the control apparatus, a first instruction upon the control apparatus determining, based on behavior classification, that a behavior of a passenger detected from a captured image or a sound of inside of a vehicle is threatening, the first instruction being an instruction to increase tension of a seat belt worn by the passenger; and receiving, by the seat belt apparatus, the first instruction.

A medium according to the present disclosure is a non-transitory medium, readable by a control apparatus for controlling a seat belt apparatus, storing a program configured to, when executed by the control apparatus, cause the control apparatus to:

transmit a first instruction upon determining, based on behavior classification, that a behavior of a passenger detected from a captured image or a sound of inside of a vehicle is threatening, the first instruction being an instruction to increase tension of a seat belt worn by the passenger.

According to the present disclosure, a driver or a fellow passenger can simply and reliably be protected against a threat posed by a passenger.

BRIEF DESCRIPTION OF THE DRAWINGS

In the accompanying drawings:

FIG. 1 is a diagram illustrating an example configuration of a control apparatus;

FIG. 2 is a diagram illustrating an example configuration of a server apparatus;

FIG. 3 is a diagram illustrating an example configuration of a vehicle; and

FIG. 4 is a flowchart illustrating an example of operations of the control apparatus.

DETAILED DESCRIPTION

Embodiments are described below.

FIG. 1 is a diagram illustrating an example configuration of a control apparatus in an embodiment. The control apparatus 10 assists in ensuring the safety of a driver or fellow passenger from threats of aggression or the like posed by a passenger using ridesharing or a taxi. The control apparatus 10 includes a server apparatus 12 and a vehicle-mounted apparatus 30 of a vehicle 13 that are communicably connected to each other via a network 14. The server apparatus 12 is, for example, a server apparatus that belongs to a cloud computing system or other computing system and implements various functions. The vehicle 13 is a taxi or any appropriate vehicle used in ridesharing. The vehicle-mounted apparatus 30 is, for example, a navigational device, a cellular phone, a smartphone, a tablet, or a personal computer (PC). The network 14 may, for example, be the Internet, but may include an ad hoc network, a local area network (LAN), a metropolitan area network (MAN), another network, or any combination thereof.

Upon determining, based on behavior classification, that a behavior of a passenger detected from a captured image or sound of the inside of the vehicle 13 is threatening, the control apparatus 10 transmits an instruction to increase the tension of a seat belt worn by the passenger. In the vehicle 13, a seat belt apparatus responds to the instruction by increasing the tension of the seat belt worn by the passenger with the threatening behavior, thereby providing the passenger with a sense of restraint from the seat belt and suppressing the behavior. According to the present embodiment, the driver or a fellow passenger can simply and reliably be protected against a threat, posed by a passenger, with minimal additional equipment in the vehicle 13.

FIG. 2 is a diagram illustrating an example configuration of the server apparatus 12. The server apparatus 12 includes a controller 21, a memory 22, a communication interface 23, an input interface 25, and an output interface 26. The server apparatus 12 is, for example, a server computer that belongs to a cloud computing system or other computing system and acts as a server that implements various functions. The server apparatus 12 may be one or more server computers that are connected to communicate with each other and operate in conjunction with each other.

The controller 21 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 21 executes information processing related to operations of the server apparatus 12 while controlling each component of the server apparatus 12.

The memory 22 includes, for example, one or more semiconductor memories, one or more magnetic memories, one or more optical memories, or a combination of at least two of these types, to function as main memory, auxiliary memory, or cache memory. The semiconductor memory is, for example, random access memory (RAM) or read only memory (ROM). The RAM is, for example, static RAM (SRAM) or dynamic RAM (DRAM). The ROM is, for example, electrically erasable programmable ROM (EEPROM). The memory 22 stores information used for operations of the server apparatus 12 and information resulting from operations of the server apparatus 12.

In the server apparatus 12, the controller 21 and the memory 22 may be connected via a bus or may be directly connected to each other without passing through a bus. Alternatively, the controller 21 may encompass the memory 22 and be configured integrally with the memory 22.

The communication interface 23 includes one or more interfaces for communication. The interface for communication is, for example, a LAN interface. The communication interface 23 receives information used for operations of the server apparatus 12 and transmits information resulting from operations of the server apparatus 12. The server apparatus 12 is connected to the network 14 by the communication interface 23 and communicates information with other devices via the network 14.

The input interface 25 includes one or more interfaces for input. The interface for input is, for example, a physical key, a capacitive key, a pointing device, a touch screen integrally provided with a display, or a microphone that accepts audio input. The interface for input may further include a camera or IC card reader for input of a captured image or image code. The input interface 25 accepts an operation for inputting information used for operations of the server apparatus 12 and transmits the inputted information to the controller 21.

The output interface 26 includes one or more interfaces for output. The interface for output is, for example, a display or a speaker. The display is, for example, an LCD or an organic EL display. The output interface 26 outputs information resulting from operations of the server apparatus 12.

The functions of the server apparatus 12 are achieved by a processor included in the controller 21 executing a control program. The control program is a program that causes the computer to execute the processing of the steps included in the operations of the server apparatus 12 for the computer to achieve the functions corresponding to the processing of the steps. That is, the control program is a program for causing the computer to function as the server apparatus 12. Some or all of the functions of the server apparatus 12 may be implemented by a dedicated circuit included in the controller 21.

In the present embodiment, the controller 21 stores information, in the memory 22, classifying behaviors by a passenger in the vehicle 13 as threatening or not. Such behavior classification is, for example, information associated with each behavior in advance and indicating whether each behavior is threatening. The behaviors include actions and sound by the passenger. Threatening behaviors are, for example, violent actions accompanied by contact, such as beating or kicking another person or the vehicle interior; preliminary actions not accompanied by contact but suggestive of beating, kicking or the like; and sound that has sound pressure above a certain level and includes words indicating intimidation, abusive language, or the like. Alternatively, the behavior classification may be implemented as a determination model in operations performed by the controller 21 using the memory 22. For example, the controller 21 builds a determination model by performing machine learning on training data associating behaviors with the impression given to others by the behaviors. The controller 21 then extracts the behavior of a passenger from a captured image or sound in the cabin of the vehicle 13 by image recognition or speech recognition and determines whether the behavior is threatening based on the behavior classification.

FIG. 3 is a diagram illustrating an example configuration of the vehicle-mounted apparatus 30 mounted in the vehicle 13. The vehicle-mounted apparatus 30 includes a controller 31, a memory 32, a communication interface 33, a positioner 34, an input interface 35, and an output interface 36. A recording apparatus 37, a seat belt apparatus 38, and a notification apparatus 39, which are controlled by the vehicle-mounted apparatus 30, are also mounted in the vehicle 13.

The controller 31 includes one or more processors, one or more dedicated circuits, or a combination thereof. The processor is a general purpose processor, such as a CPU, or a dedicated processor that is dedicated to specific processing. The dedicated circuit is, for example, an FPGA or an ASIC. The controller 31 executes information processing related to operations of the vehicle-mounted apparatus 30 while controlling each component of the vehicle-mounted apparatus 30.

The memory 32 includes, for example, one or more semiconductor memories, one or more magnetic memories, one or more optical memories, or a combination of at least two of these types, to function as main memory, auxiliary memory, or cache memory. The semiconductor memory is, for example, RAM or ROM. The RAM is, for example, SRAM or DRAM. The ROM is, for example, EEPROM. The memory 32 executes information processing related to operations of the vehicle-mounted apparatus 30 while also storing information used for operations of the vehicle-mounted apparatus 30 and information resulting from operations of the vehicle-mounted apparatus 30.

The communication interface 33 includes one or more interfaces for communication. Examples of the interface for communication include an interface conforming to mobile communication standards such as LTE, 4G, or 5G. The communication interface 33 receives information used for operations of the vehicle-mounted apparatus 30 and transmits information resulting from operations of the vehicle-mounted apparatus 30. The vehicle-mounted apparatus 30 is connected to the network 14 by the communication interface through a mobile communication base station and communicates information with other apparatuses via the network 14.

The positioner 34 includes one or more GNSS receivers. GNSS includes, for example, GPS, QZSS, GLONASS, and/or Galileo. The positioner 34 acquires positional information for the vehicle 13.

The input interface 35 includes one or more interfaces for input. The interface for input is, for example, a physical key, a capacitive key, a pointing device, a touch screen integrally provided with a display, or a microphone that accepts audio input. The interface for input may further include a camera or IC card reader for input of a captured image or image code. The input interface 35 accepts an operation for inputting information used for operations of the vehicle-mounted apparatus 30 and transmits the inputted information to the controller 31.

The output interface 36 includes one or more interfaces for output. The interface for output is, for example, a display or a speaker. The display is, for example, an LCD or an organic EL display. The output interface 36 outputs information resulting from operations of the vehicle-mounted apparatus 30.

The functions of the vehicle-mounted apparatus 30 are achieved by a processor included in the controller 31 executing a control program. The control program is a program that causes the computer to execute the processing of the steps included in the operations of the vehicle-mounted apparatus 30 for the computer to achieve the functions corresponding to the processing of the steps. That is, the control program is a program for causing the computer to function as the vehicle-mounted apparatus 30. Some or all of the functions of the vehicle-mounted apparatus 30 may be implemented by a dedicated circuit included in the controller 31.

The recording apparatus 37 includes one or more cameras, and a control circuit thereof, provided at a position from which an image of the seat of an occupant in the cabin of the vehicle 13 can be captured. The camera included in the recording apparatus 37 may be a monocular camera or a stereo camera. The recording apparatus 37 further includes a sound recorder, and a control circuit thereof, for recording sound in the cabin of the vehicle 13. The recording apparatus 37 captures images and records sound in the cabin of the vehicle 13 at freely chosen time intervals and transmits the captured images and sound information to the controller 31 of the vehicle-mounted apparatus 30.

The seat belt apparatus 38 is provided in each seat of the vehicle 13 and includes a sensor for detecting the tension of the seat belt, along with a drive mechanism for winding up the seat belt and a control circuit thereof. The seat belt apparatus 38 transmits information indicating the tension of the seat belt to the controller 31 of the vehicle-mounted apparatus 30. The seat belt apparatus 38 also controls the driving mechanism of the seat belt to increase or decrease the tension of the seat belt in response to an instruction from the controller 31.

The notification apparatus 39 includes a speaker and a display, and control circuitry thereof, for outputting audio and an image viewable from the seats in the vehicle cabin. The notification apparatus 39 outputs an image or audio corresponding to the instruction and information transmitted from the controller 31 of the vehicle-mounted apparatus 30.

Next, operations of the control apparatus 10 are described with reference to FIG. 4.

FIG. 4 is a flowchart illustrating operation procedures of the control apparatus 10. The operation procedures of the control apparatus 10 are performed independently by one, or shared by both, of the controller 21 of the server apparatus 12 and the controller 31 of the vehicle-mounted apparatus 30. The procedures of FIG. 4 are, for example, performed at any appropriate period (for example, a period of several milliseconds to several seconds) when the vehicle-mounted apparatus 30 operates while the vehicle 13 provides a taxi or car sharing service. Alternatively, information indicating that the driver of the vehicle 13 has boarded a passenger may be inputted to the vehicle-mounted apparatus 30, and the procedures of FIG. 4 may start in response to the input.

In step S400, the control apparatus 10 acquires a captured image and sound information inside the cabin of the vehicle 13. For example, in the vehicle 13, the recording apparatus 37 captures images at any appropriate frame rate, records sound accompanying the images, and transmits the captured images and the sound information associated with the captured images to the vehicle-mounted apparatus 30. The controller 31 of the vehicle-mounted apparatus 30 transmits the captured images and sound information to the server apparatus 12 via the communication interface 33. The controller 21 of the server apparatus 12 receives the captured images and sound information via the communication interface 23 and stores them in the memory 22. Each time the controller 21 executes the procedures of FIG. 4, the controller 21 acquires the captured images of any appropriate number of frames and the sound information accompanying the captured images by reading from the memory 22.

In step S402, the control apparatus 10 acquires seat belt wearing information for the vehicle 13. For example, the wearing information includes whether the seat belt of each seat is worn, and if so, the tension of the seat belt. For example, in the vehicle 13, the seat belt apparatus 38 transmits the wearing information to the vehicle-mounted apparatus 30 over any appropriate period (such as a period of several milliseconds to several seconds). The controller 31 of the vehicle-mounted apparatus 30 transmits the wearing information to the server apparatus 12 via the communication interface 33. The controller 21 of the server apparatus 12 receives the wearing information via the communication interface 23, stores the wearing information in the memory 22, and acquires the wearing information by reading from the memory 22 each time the controller 21 executes the procedures of FIG. 4.

In step S404, the control apparatus 10 extracts passenger behavior from the acquired captured images and sound information. For example, the controller 21 of the server apparatus 12 performs image recognition processing and speech recognition processing to extract passenger behavior from the captured images and sound information by pattern matching or the like. At this time, the controller 21 identifies the seat in which the passenger is seated by image recognition processing and stores the position of the seat in the memory 22 in association with the passenger behavior.

In step S406, the control apparatus 10 determines whether the extracted behavior is threatening. For example, the controller 21 of the server apparatus 12 determines whether the extracted behavior is threatening based on behavior classification. For example, when the behavior is a violent action accompanied by contact, such as beating or kicking another person or the vehicle interior, a preliminary action not accompanied by contact but suggestive of beating, kicking or the like, or sound that has sound pressure above a certain level and includes words indicating intimidation, abusive language, or the like, the controller 21 determines that the behavior is threatening. The controller 21 determines that the behavior is not threatening when no particular behavior is extracted, or the extracted behavior does not correspond to a violent action, preliminary action, or intimidation, abusive language, or the like.

In step S408, the control apparatus 10 advances to step S410 if the behavior is determined to be threatening (step S408: Yes) but advances to step S420 if the behavior is determined not to be threatening (step S408: No).

In step S410, the control apparatus 10 counts the duration of the threatening behavior. For example, the controller 21 of the server apparatus 12 cumulatively counts the elapsed time since the point in time when the threatening behavior was detected in the previous processing cycle and stores the result in the memory 22.

In step S412, the control apparatus 10 determines whether the duration of the threatening behavior exceeds a reference duration. For example, the controller 21 of the server apparatus 12 determines whether the duration counted in step S410 exceeds any appropriate reference duration (for example, several seconds to several tens of seconds). The control apparatus 10 advances to step S414 if the duration exceeds the reference duration (step S412: Yes) but terminates the processing cycle of FIG. 4 if the duration does not exceed the reference duration (step S412: No).

In step S414, the control apparatus 10 determines, based on the wearing information, whether the seat belt is worn in the seat of the passenger exhibiting the threatening behavior. The control apparatus 10 advances to step S416 if the seat belt of the passenger is worn (step S414: Yes) but advances to step S418 if the seat belt of the passenger is not worn (step S414: No).

In step S416, the control apparatus 10 transmits an instruction to the seat belt apparatus 38 of the vehicle 13 for increasing the tension of the seat belt. For example, the controller 21 of the server apparatus 12 detects the current tension based on the wearing information and generates an instruction for increasing the tension from the current tension. For example, the tension is regulated in any appropriate steps. The controller 21 selects a tension that is one or more steps greater than the current tension and generates the instruction. The controller 21 then transmits the instruction for increasing the tension to the vehicle-mounted apparatus 30 via the communication interface 23. Upon receiving, via the communication interface 33, the instruction for increasing the tension, the controller 31 of the vehicle-mounted apparatus 30 transmits the instruction to the seat belt apparatus 38. In response, the seat belt apparatus 38 controls the drive mechanism of the seat belt to increase the tension. This causes the seat belt to be rolled up, increasing the tension of the seat belt and providing the passenger with a stronger sense of restraint.

In step S418, the control apparatus 10 transmits an instruction to the notification apparatus 39 of the vehicle 13 for outputting a notification to the passenger. For example, the controller 21 of the server apparatus 12 generates a notification that includes words indicating to tone down or discontinue the threatening behavior. The notification includes words such as "stop" or "calm down", for example, and symbols appealing to the passenger to tone down or discontinue the threatening behavior. The controller 21 then transmits the instruction for outputting the generated notification to the vehicle-mounted apparatus 30 via the communication interface 23. Upon receiving, via the communication interface 33, the instruction for outputting the notification, the controller 31 of the vehicle-mounted apparatus 30 transmits the instruction to the notification apparatus 39. In response, the notification apparatus 39 outputs the notification to the passenger by display or audio. The passenger is thus notified of the request to tone down or discontinue the threatening behavior. The control apparatus 10 then terminates the processing cycle of FIG. 4.

By steps S416 and S418 being executed, the passenger can be provided with a sense of restraint from the seat belt, which combined with the notification can more efficiently suppress the behavior of the passenger. Even if the passenger is not wearing a seat belt (step S414: No), step S418 can still be performed to keep the passenger's behavior in check with the notification.

If the passenger's threatening behavior subsides in a relatively short period of time, then providing the sense of restraint from the seat belt could instead provoke the passenger. Such unnecessary provocation can be avoided by setting the reference duration for the determination in step S412 to an appropriate length.

If the passenger's behavior is not determined to be threatening (S408: No), then in step S420, the control apparatus 10 determines whether the driver or a fellow passenger has reported a threat. For example, when the driver perceives the passenger's behavior to be threatening, the driver inputs a report of threatening behavior to the input interface 35 of the vehicle-mounted apparatus 30. For example, the driver provides the input via an alarm button, a tap area, or the like on the vehicle-mounted apparatus 30. The controller 31 of the vehicle-mounted apparatus 30 then transmits the report of the threat to the server apparatus 12 via the communication interface 33. The controller 21 of the server apparatus 12 receives the report via the communication interface 33. The control apparatus 10 advances to step S422 if the report is received (S420: Yes) and advances to step S424 if the report is not received (S420: No).

Alternatively, each seat may be provided with a button or the like for reporting a threat, and when the button is pressed by a fellow passenger, the vehicle mounted apparatus 30 may respond by transmitting a report to the server apparatus 12. Alternatively, if a terminal apparatus carried by a fellow passenger is communicably connected by short-range communication or mobile communication with the vehicle mounted apparatus 30, or is communicably connected by mobile communication with the server apparatus 12, then a report may be transmitted to the vehicle-mounted apparatus 30 or the server apparatus 12 by the fellow passenger operating a dedicated application on the terminal apparatus. For example, the fellow passenger identifies his or her seat position with the application and transmits a report to the vehicle-mounted apparatus 30. The control apparatus 10 can determine the seat from which the report was transmitted and can consider the report as being a report of threatening behavior when the report is transmitted from a seat other than the seat of the passenger exhibiting the threatening behavior.

In step S422, the control apparatus 10 revises the behavior classification to associate a threat with the extracted behavior. The controller 21 of the server apparatus 12 revises the information, stored in the memory 22, that classifies behaviors as threatening or not. Alternatively, the controller 21 may associate the extracted behavior with a threatening impression and reflect the result in the training data that associates behaviors with the impression given to others by the behaviors. The controller 21 may thereby revise the training data and perform machine learning. In this way, the determination accuracy of subsequent behaviors can be improved. The control apparatus 10 then advances to step S410 and executes the steps from step S412 onward. In other words, since the passenger is exhibiting a threatening behavior in this case, the control apparatus 10 increases the tension of the seat belt and/or outputs a notification.

If no threat report is made (step S420: No), then in step S424, the control apparatus 10 resets the cumulative count of the duration of the threatening behavior. In step S426, the control apparatus 10 then transmits an instruction to reduce the tension of the seat belt of the vehicle 13. For example, the controller 21 of the server apparatus 12 detects the current tension based on the wearing information and generates an instruction for decreasing the tension from the current tension. The controller 21 then transmits the instruction for decreasing the tension to the vehicle-mounted apparatus 30 via the communication interface 23. The controller 31 of the vehicle-mounted apparatus 30 receives the instruction via the communication interface 33 and transmits the instruction to the seat belt apparatus 38. In response, the seat belt apparatus 38 controls the drive mechanism of the seat belt to reduce the tension. This relaxes the seat belt and relieves the sense of restraint provided to the passenger. The reduction of tension may be suspended, however, if the tension falls below the tension required for the seat belt to fulfill its function of securing the passenger. The processing cycle of FIG. 4 then terminates.

According to the present embodiment, the safety of a driver or a fellow passenger against a threat posed by a passenger can be ensured simply, i.e. without providing additional equipment, such as a partition, in the vehicle 13. By determining the correspondence between a behavior and a threat, the control apparatus 10 can also ensure the safety of the driver or a fellow passenger from a threat by a passenger. A movable partition may, however, be provided between the seats in the vehicle 13, and in addition to the increased tension of the seat belt and the notification, the partition between the passenger exhibiting threatening behavior and the driver or a fellow passenger may be operated for separation from the passenger exhibiting the threatening behavior.

When the seat belt tension is increased, the seat belt may be locked and temporarily prevented from being released to more reliably ensure safety from a threat by the passenger. For example, an instruction to lock the seat belt may be included in the instruction for increasing tension transmitted from the control apparatus 10 to the seat belt apparatus 38. In response, the seat belt apparatus 38 may operate a lock mechanism.

In the aforementioned configuration, the notification apparatus 39 may include illumination in the cabin of the vehicle 13 and may output notification by colored illumination, a flashing pattern, or the like that allays the threatening behavior.

In the above-described embodiment, a processing/control program that specifies operations of the vehicle-mounted apparatus 30 may be stored in the server apparatus 12 and be downloaded onto each apparatus via the network 14. The processing/control program may also be stored on a non-transitory recording/storage medium readable by each apparatus, and each apparatus may read the program from the medium.

The present disclosure is not limited to the embodiments described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

The invention claimed is:

1. A control apparatus comprising:
   a controller configured to, upon determining, based on behavior classification, that a behavior of a passenger detected from a captured image or a sound of inside of a vehicle is threatening, transmit a first instruction to increase tension of a seat belt worn by the passenger, the controller is configured to transmit the first instruction each time the behavior of the passenger is determined to be threatening for a predetermined duration.

2. The control apparatus of claim 1, wherein the controller is configured to transmit the first instruction upon receiving a report indicating a threat, even when the behavior of the passenger is determined not to be threatening.

3. The control apparatus of claim 2, wherein the controller is configured to revise the behavior classification to classify the behavior of the passenger as threatening.

4. The control apparatus of claim 1, wherein the controller is configured to further transmit a second instruction to output information, inside of the vehicle, for suppressing the behavior.

5. A seat belt apparatus configured to increase tension of a seat belt in response to the first instruction transmitted from the control apparatus of claim 1.

6. A vehicle comprising the seat belt apparatus of claim 5.

7. A system comprising the control apparatus of claim 1 and a seat belt apparatus.

8. A method of operating a control apparatus for controlling a seat belt apparatus, the method comprising:
   transmitting, by the control apparatus, a first instruction upon the control apparatus determining, based on behavior classification, that a behavior of a passenger detected from a captured image or a sound of inside of a vehicle is threatening, the first instruction being an instruction to increase tension of a seat belt worn by the passenger; and
   receiving, by the seat belt apparatus, the first instruction, wherein the transmitting includes transmitting, by the control apparatus, the first instruction each time the behavior of the passenger is determined to be threatening for a predetermined duration.

9. The method of operating a control apparatus of claim 8, wherein the transmitting includes transmitting, by the control apparatus, the first instruction upon receiving a report indicating a threat, even when the behavior of the passenger is determined not to be threatening.

10. The method of operating a control apparatus of claim 9, further comprising revising, by the control apparatus, the behavior classification to classify the behavior of the passenger as threatening.

11. The method of operating a control apparatus of claim 8, further comprising transmitting, by the control apparatus to a notification apparatus, a second instruction to output information, inside of the vehicle, for suppressing the behavior.

12. The method of operating a control apparatus of claim 8, further comprising increasing, by the seat belt apparatus, the tension of the seat belt in response to the first instruction.

13. A non-transitory medium, readable by a control apparatus for controlling a seat belt apparatus, storing a program configured to, when executed by the control apparatus, cause the control apparatus to:
   transmit a first instruction upon determining, based on behavior classification, that a behavior of a passenger detected from a captured image or a sound of inside of a vehicle is threatening, the first instruction being an instruction to increase tension of a seat belt worn by the passenger,
   wherein the program is further configured to cause the control apparatus to transmit the first instruction each time the behavior of the passenger is determined to be threatening for a predetermined duration.

14. The non-transitory medium of claim 13, wherein the program is further configured to cause the control apparatus to transmit the first instruction upon receiving a report indicating a threat, even when the behavior of the passenger is determined not to be threatening.

15. The non-transitory medium of claim 13, wherein the program is further configured to cause the control apparatus to transmit the first instruction upon receiving a report indicating a threat, even when the behavior of the passenger is determined not to be threatening.

16. The non-transitory medium of claim 14, wherein the program is further configured to cause the control apparatus to revise the behavior classification to classify the behavior of the passenger as threatening.

17. The non-transitory medium of claim 13, wherein the program is further configured to cause the control apparatus to transmit, to a notification apparatus, a second instruction to output information, inside of the vehicle, for suppressing the behavior.

\* \* \* \* \*